United States Patent [19]

Phillips et al.

[11] Patent Number: 4,918,706
[45] Date of Patent: Apr. 17, 1990

[54] SPREAD SPECTRUM LONG LOOP RECEIVER

[75] Inventors: Fred W. Phillips, Afton; Kelly L. Mahoney, Louisa; Edmund S. Zavada, Charlottesville, all of Va.

[73] Assignee: Sperry Marine Inc., Charlottesville, Va.

[21] Appl. No.: 290,967

[22] Filed: Dec. 28, 1988

[51] Int. Cl.⁴ .............................................. H04K 1/04
[52] U.S. Cl. ...................................................... 375/1
[58] Field of Search .............................. 375/1; 380/34

[56] References Cited

U.S. PATENT DOCUMENTS 4,325,138  4/1982  Zscheile, Jr. ........................... 375/1

Primary Examiner—Salvatore Cangialosi
Attorney, Agent, or Firm—Seymour Levine

[57] ABSTRACT

A Long Loop GPS receiver converts the pseudo random noise code bi-phase modulated input signal to a first IF frequency. The first IF is correlated against a duplicate of the pseudo random noise code that modulates the input signal. The correlator output is converted to a last IF having a frequency of one-half the pseudo random noise code sequence repetition rate. Local oscillator leakage into the receiver input is spread in spectrum by the correlator into spectral lines that do not lie on the received signal. A bandpass filter in the last IF removes the leakage spectral lines. A hard limiter converts the last IF to digital format. A digital phase detector adjusts the local oscillator to lock the local oscillator signal to the receive signal. The correlator pseudo random noise code signal is clocked by the local oscillator.

10 Claims, 3 Drawing Sheets

SPREAD SPECTRUM LONG LOOP RECEIVER

BACKGROUND OF THE INVENTION

1. Field of the Invention

The invention relates to spread spectrum communication, particularly with respect to Global Positioning System (GPS) receivers.

2. Description of the Prior Art

The GPS is a navigation system utilizing a plurality of satellites in diverse orbital positions. Each satellite transmits an L-band carrier biphase modulated by a spectrum spreading Pseudo Random Noise (PRN) code identifying the satellite and by a 50 baud navigation data message. In the present day system, the carrier frequency is 1575.42 MHz and the PRN code has a clock rate of 1.023 MHz and a code length of 1023 bits. The code repeats the predefined sequence thereof once each millisecond (1 Khz repetition rate).

In order to receive the GPS signal structure, a GPS receiver generates an exact duplicate of the spreading code and aligns it in time to the receive code using correlation techniques. The receiver thus removes the spreading code from the carrier (unmodulates the carrier) leaving only the biphase 50 baud data message thereon. The data message is used by the GPS receiving equipment to solve the navigation problem.

Two receiver architectures are generally utilized for GPS; viz, the Long Loop receiver and the Delay Lock Loop (DLL) receiver. These two GPS receiver architectures utilize different methods in maintaining the PRN code in time alignment. In the DLL receiver, the code is maintained aligned by a tracking loop. The tracking loop delays and advances the code in time and generates decisions as to where the best alignment occurs. The Delay Lock Loop must operate continuously and is subject to acquisition anomalies and mistracking caused by noise. The implementation of a code tracking DLL is complex and expensive and requires both digital hardware and software.

The Long Loop Receiver does not require a tracking loop to maintain the code aligned. The Long Loop Receiver phase locks the oscillators thereof to the received carrier and utilizes the oscillators to generate the local PRN code. Since the receiver oscillators are phase locked to the received carrier, they are phase coherent with respect to the satellite transmitter oscillators that generated the transmitted PRN code. Thus, the locally generated PRN code will not drift relative to the received code and therefore no tracking loop is required.

Although the Long Loop Receiver satisfies the desideratum of eliminating the requirement for a code tracking loop, it suffers from a problem associated with such receivers. The sum of the local oscillator frequencies is always equal to the frequency of the receive signal. This locally generated receive frequency tends to leak into the input of the receiver and be down converted through the intermediate frequency (IF) stages. Frequently, a Long Loop Receiver will suffer from false lock-ups where it locks to itself. Poor sensitivity is another symptom of internal leakage. In order to attempt to obviate the leakage problem, critical designs with respect to shielding and physical placement of the receiver components must be utilized. Thus, when Long Loop Receivers are implemented, a large number of carefully packaged shielded enclosures are required to achieve sufficient isolation. For this reason, GPS receivers generally are constructed utilizing Delay Lock Loop techniques with the attendant disadvantages discussed above.

Present day GPS receivers frequently utilize digital data processing after the receiver IF sections for performing phase detection and loop error signal generation to maintain the receiver aligned to the incoming code. Typically, the input signals to the digital section of such receivers are in the megahertz range requiring critical and expensive high speed digital circuitry.

SUMMARY OF THE INVENTION

The disadvantages of the prior art are obviated by a Long Loop GPS receiver utilizing a last IF frequency equal to one-half of the PRN code repetition rate. Local oscillator leakage signals when correlated in the receiver IF section with the PRN code are spread into spectral lines that do not fall on the receive signal. The last IF signal of the receiver is bandpass filtered to remove the spurious leakage spectral lines. The frequency of the last IF signal is chosen in the lowest frequency gap between leakage terms resulting in lowest possible speed digital circuitry.

DESCRIPTION OF THE PREFERRED EMBODIMENT

Figure 1:
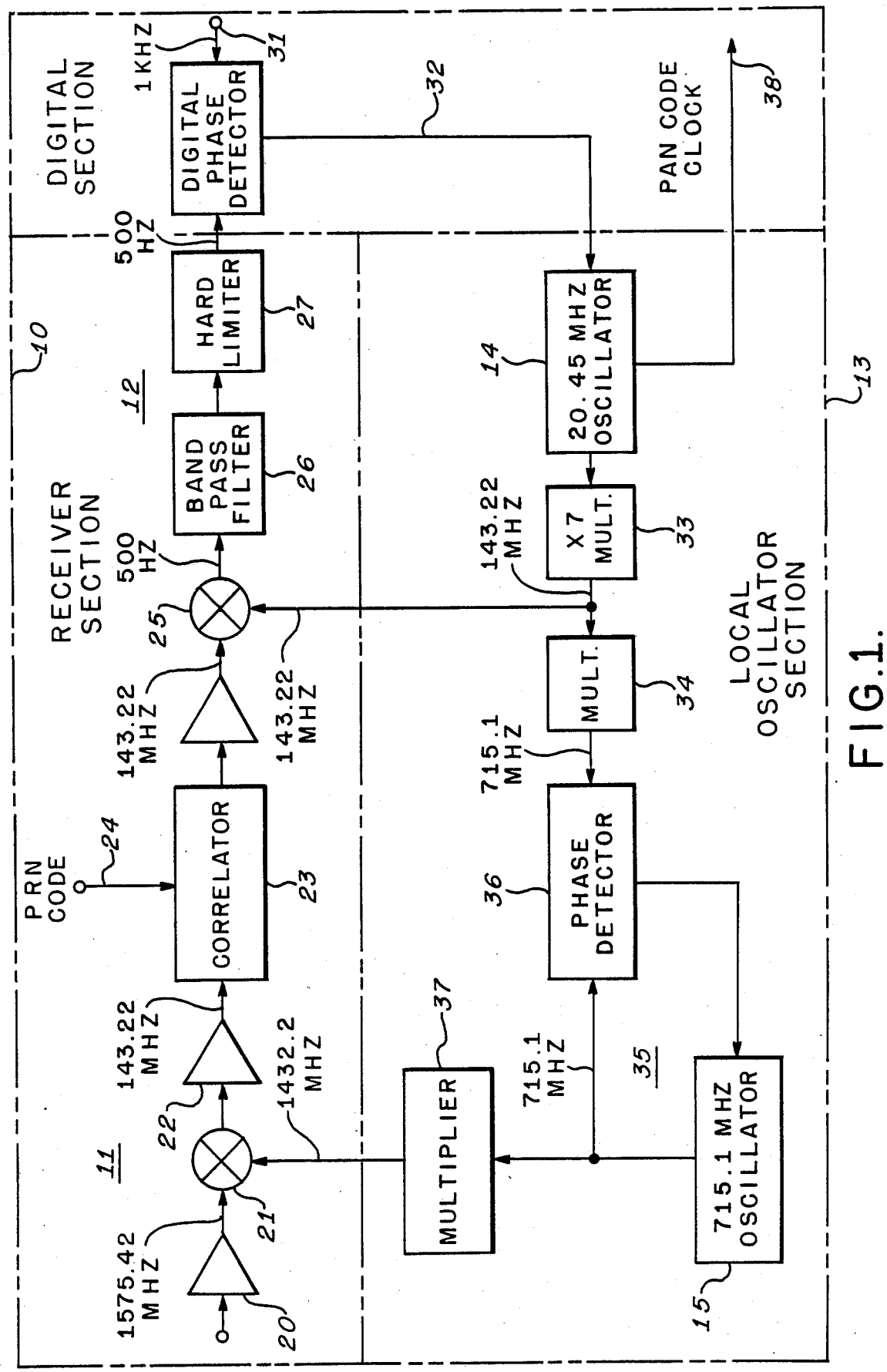
FIG. 1 is a schematic block diagram of the GPS receiver equipment implemented in accordance with the present invention.

Referring to FIG. 1, the GPS receiver apparatus of the present invention includes a receiver section 10 having a first IF section 11 and a last IF section 12. The apparatus further comprises a local oscillator section 13 which includes a 20.46 MHz local oscillator 14 and a 716.1 MHz local oscillator 15. The last IF 12 provides an input to a digital section 16 that closes the loop back to the local oscillator section 13.

The received signal is applied through an amplifier 20 to a mixer 21. The mixer converts the received signal from the amplifier 20 to the first IF frequency of 143.22 MHz. The mixer 21 receives a 1432.2 MHz local oscillator signal from the local oscillator section 13 for this purpose. The first IF signal from the mixer 21 is applied through an amplifier and filter 22 to a PRN correlator 23. The amplifier and filter 22 removes spurious out of band frequency components. The PRN code, which is a duplicate of the code utilized at the satellite transmitter, is applied to the correlator 23 at a terminal 24. The correlator 23 performs a correlation of the first IF signal from the amplifier filter 22 with respect to the PRN code applied to the terminal 24 thereby removing the PRN code from the carrier.

Figure 2:
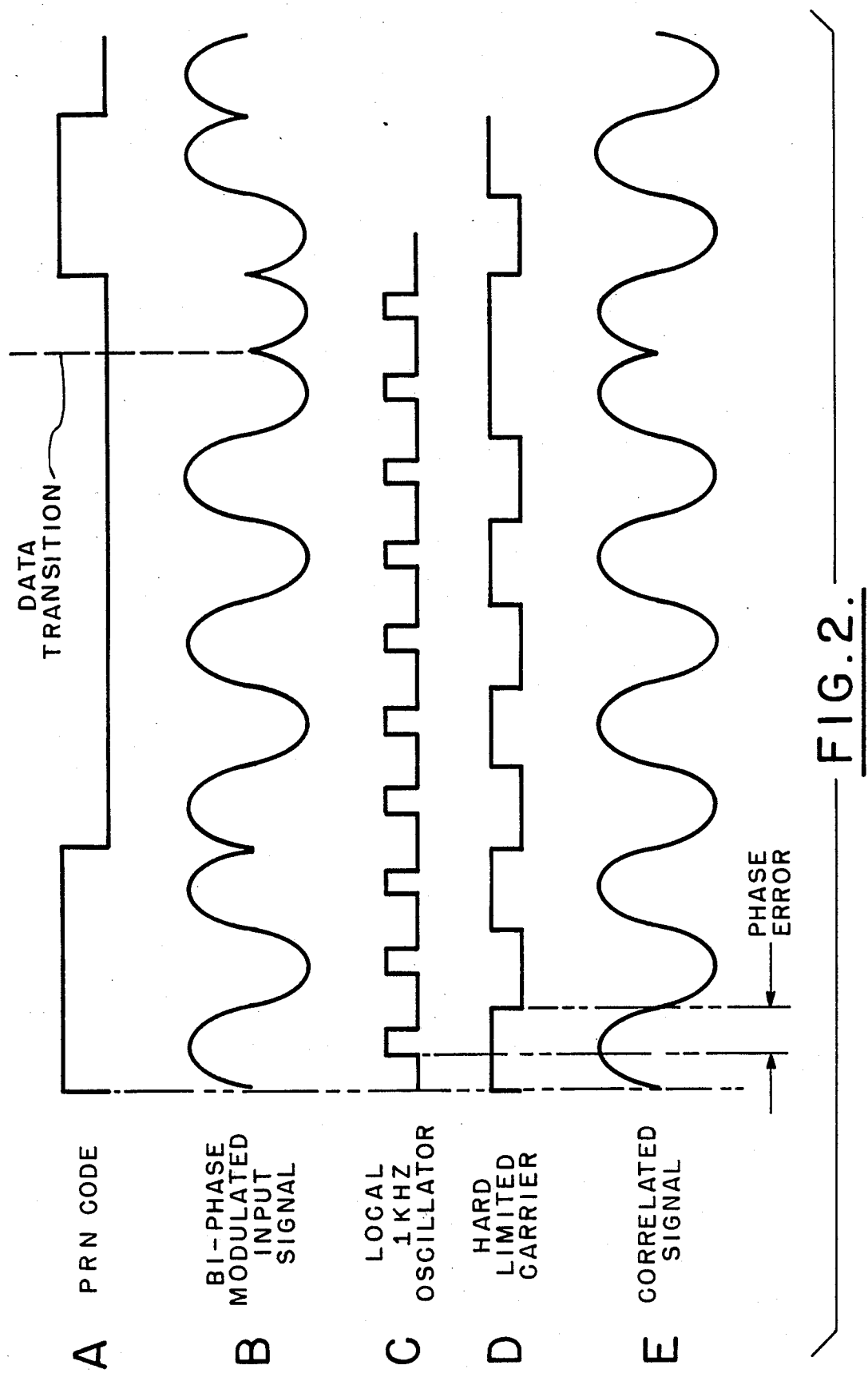
FIG. 2 is a diagram illustrating waveforms appearing at various points of FIG. 1.

Referring to FIG. 2, waveform B illustrates a typical input carrier signal applied to the amplifier 20 bi-phase modulated by the PRN code signal of waveform A. A data transition of the 50 baud data message is also illustrated resulting in a phase transition in the carrier of waveform B. Waveform E illustrates the code modulated carrier with the code removed by the correlator 23. The phase transition caused by the illustrated data bit is, however, still present.

With continued reference to FIG. 1, the output from the correlator 23 is applied through an amplifier and filter 24 as an input to a mixer 25. The amplifier and filter 24 removes spurious out of band components generated by the correlation process of the correlator 23. The mixer 25 converts the first IF signal from the amplifier filter 24 to the last IF signal of 500 Hz. To this effect, the mixer 25 receives a 143.22 MHz local oscillator signal from the local oscillator section 13. The 500 Hz last IF signals from the mixer 25 is amplified and filtered by a bandpass amplifier and filter 26, with a center frequency of 500 Hz and a bandwidth of 300 Hz. The bandpass amplifier filter 26 is implemented by low cost operational amplifier filters for removing leakage spectral lines, in a manner to be described. The amplified and bandpass filtered signal from the bandpass filter 26 is converted to digital signals by a hard limiter 27. The output of the hard limiter 27 is illustrated in waveform D of FIG. 2. It is appreciated that the hard limiter 27 hard limits the correlated signal of waveform E resulting in the signal of waveform D of FIG. 2.

The digitized output of the hard limiter 27 is applied to the digital section 16 as an input to a digital phase detector 30. The digital phase detector 30 also receives a digital 1 KHz local oscillator signal applied at a terminal 31. Waveform C of FIG. 2 illustrates the 1 KHz local oscillator clock signal. The digital phase detector 30 generates an error signal on a line 32 in accordance with the phase difference between the 1 KHz clock pulses and the hard limited carrier signal from the hard limiter 27. The phase error signal on the line 32 is applied to the frequency control input of the local oscillator 14. A frequency multiplier 33 multiplies the 20.46 MHz signal from the local oscillator 14 by a factor of 7 to provide the 143.22 MHz local oscillator signal to the mixer 25. The 143.22 MHz local oscillator signal from the multiplier 33 is also applied to a multiplier 34. The multiplier 34 multiplies the 143.22 MHz signal by a factor of 5 to provide a 716.1 MHz signal. The 716.1 MHz signal is applied to a phase locked loop 35 comprised of the local oscillator 15 and a phase detector 36. The phase locked loop 35 is utilized to provide a stable low spurious content local oscillator signal to the first IF section 11. The phase locked 716.1 MHz signal from the local oscillator 15 is applied to a multiplier 37 where it is multiplied by a factor of 2 to generate the 1432.2 MHz local oscillator signal applied to the mixer 21.

Thus, the 20.46 MHz signal from the local oscillator 14 is multiplied up to create the two local oscillator signals at 143.22 and 1432.2 MHz. The receive signal from the amplifier 20 is correlated by the correlator 23 in the first IF section 11 and converted to the 500 Hz last IF signal in the last IF section 12. The 500 Hz last IF signal is digitized by the hard limiter 27 and the loop is locked in the digital section 16. The loop is locked by adjusting the output of the local oscillator 14 until the error signal on the line 32 is driven to null at which time the leading edges of the local 1 KHz oscillator clock will be centered between the edges of the hard limited carrier. It is appreciated from FIG. 2 that the 50 baud data may be recoverd by well known techniques in the GPS technology.

Prior to correlation by the correlator 23, the receive signal occupies several megahertz of bandwidth and has a very low signal-to-noise ratio. After correlation by the correlator 23, the signal occupies approximately 100 Hz of bandwidth and has a 30 dB higher signal-to-noise ratio. The output of the local oscillator 14 provides a signal on a line 38 to clock the PRN code applied to the terminal 24 of the correlator 23.

Figure 3:
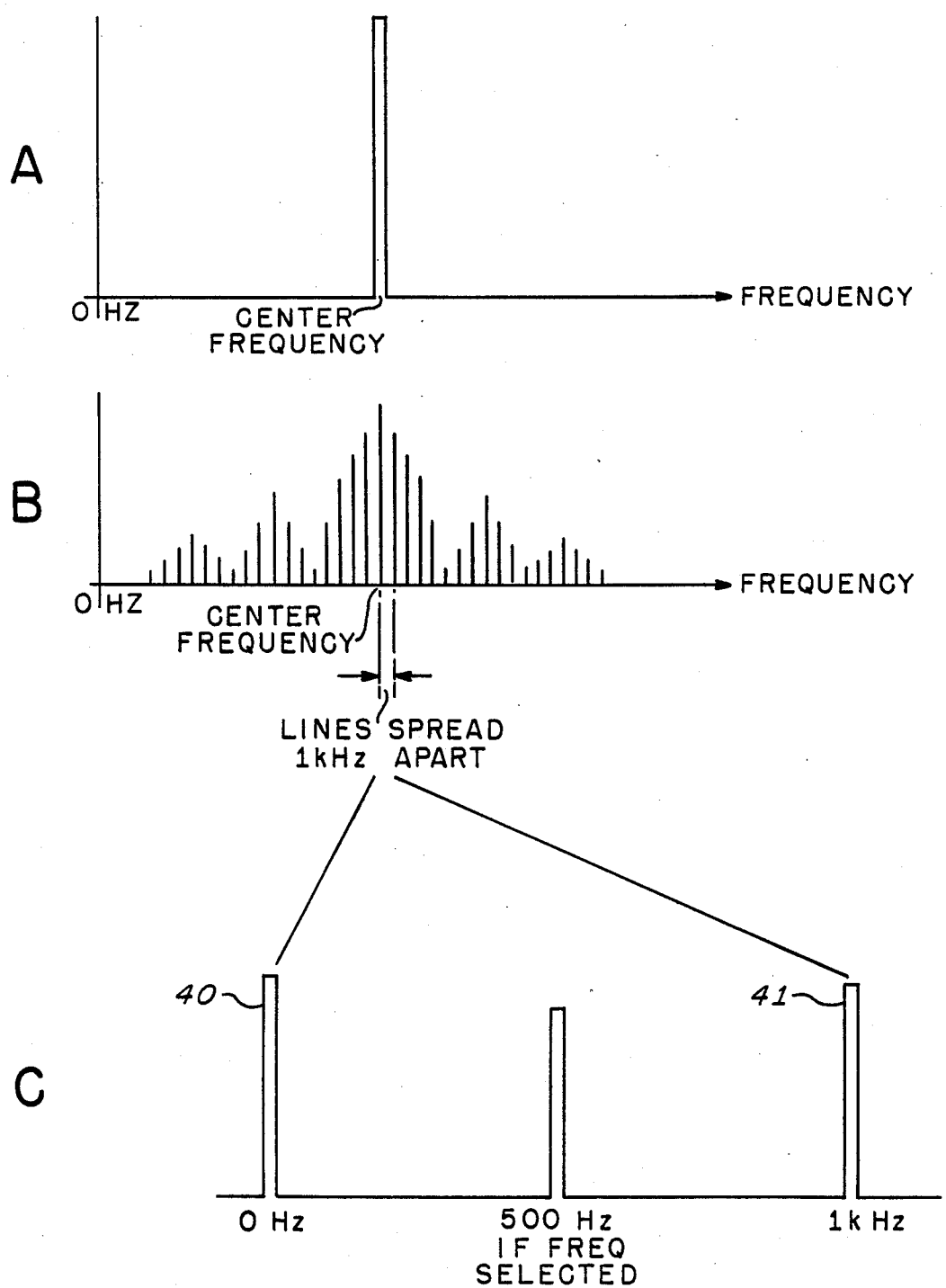
FIG. 3 is a spectral waveform diagram illustrating spectrums in the IF section of the receiver of FIG. 1.

The advantages of the architecture of the present invention are obtained by selecting the last IF frequency to be $\frac{1}{2}$ of the PRN code repetition rate. The 1023 length PRN code clocked at 1.023 MHz repeats at a rate of 1 KHz. Thus, the last IF frequency is selected to be 500 Hz. To appreciate why this eliminates the requirement for the extensive shielding and critical designs of the prior art, as discussed above, reference is made to FIG. 3 with continued reference to FIG. 1. Leakage from the local oscillator section 13 to the input of the receiver section 10 at the amplifier 20 is spread in spectrum by the PRN correlator 23. The local oscillator harmonic leakage prior to the spread spectrum PRN correlation is illustrated in waveform A of FIG. 3. Thus, the leakage term appears as a single frequency until it passes through the correlator 23. The local oscillator harmonic leakage after spread spectrum PRN correlation is illustrated in waveform B of FIG. 3. Thus, the correlator 23 spreads the spectrum of the leakage term over a bandwidth of several megahertz. A unique property of the spread leakage is that it is comprised of discrete lines occurring at one KHz intervals. When these lines are down converted to the last IF in the last IF section 12, the lies will always occur at 0, 1 KHz, 2 KHz, 3 KHz . . . to several megahertz. The correlated receive frequency, however, only occupies a 100 Hz frequency band. Thus, by placing the frequency of the last IF signal between the 1 KHz leakage lines, no leakage term will fall directly on the received signal. It is appreciated that the last IF can be placed between any of the leakage lines. Preferably, the last IF frequency is placed in the lowest frequency gap between 0 and 1 KHz. This imposes the minimum digital speed requirements on the digital section 16. Thus, the receiver of FIG. 1 was designed to provide a last IF of 500 Hz. In the 500 Hz IF section 12, the leakage terms at 0 Hz, 1 KHz, 2 KHz . . . are readily filtered out by the bandpass filter 26 which may be implemented by low cost operational amplifier filters. Thus, with respect to waveform C of FIG. 3, the undesired spectral lines 40 and 41 are removed by the bandpass filter 26 leaving the desired selected 500 Hz IF frequency.

It is appreciated from the foregoing, that the invention described herein comprises a Long Loop GPS receiver which requires little or no shielding and utilizes a very low last IF frequency. Utilizing the low last IF frequency reduces to a minimum the speed requirements of the digital processing section of the receiver. The architecture described herein is optimal in that it permits use of the desirable long loop architecture without expensive shielding and utilizes the lowest practical last IF frequency.

The invention has the advantages of providing a simple architecture with no code tracking loop, the lowest last IF frequency for digital processing, no expensive shielding required and simplified packaging since all of the oscillators and frequency multipliers of FIG. 1 can reside on the same printed circuit board. In the preferred embodiment of the invention, all of the components of the receiver section 10 and the local oscillator section 13 reside on a single printed circuit board. The receiver as described herein does not require any shielding to operate properly. Low cost shield enclosures may be utilized, however, to protect against ingress and egress of radiated EMI. Thus, the architecture of the present invention permits the leakage to occur and by utilizing the unique structure of the spread spectrum signals, the performance of the receiver is not diminished by its presence.

While the invention has been described in its preferred embodiment, it is to be understood that the words which have been used words of description rather than limitation and that changes may be made within the purview of the appended claims without departing from the true scope and spirit of the invention in its broader aspects.

We claim:

1. Spread spectrum receiver apparatus having an input for receiving a carrier signal phase modulated with a predetermined code, comprising
    correlator means responsive to said received signal and to a local code identical to said predetermined code to provide a correlator signal,
    local oscillator means for providing a local oscillator signal,
    said local oscillator signal tending to leak into said input resulting in a leakage signal in said receiver apparatus,
    said correlator means being responsive to said leakage signal to spread the spectrum thereof into a plurality of spectral lines,
    mixer means responsive to said correlator signal and said local oscillator signal for providing a last IF signal,
    said local oscillator means being constructed and arranged so that said local oscillator signal results in said last IF signal having a frequency that lies between two consecutive of said spectral lines, and
    filter means responsive to said last IF signal for filtering out said spectral lines from said last IF signal.

2. The apparatus of claim 1 wherein said predetermined and local codes comprise a pseudo random noise code.

3. The apparatus of claim 2 wherein said local oscillator means comprises means for providing said local oscillator signal so that said frequency of said last IF signal lies between said two consecutive spectral lines of lowest frequencies.

4. The apparatus of claim 3 wherein
    said pseudo random noise code has a code sequence repetition rate, and
    said local oscillator means comprises means for generating said local oscillator signal so that said frequency of said last IF signal is equal to one-half of said code sequence repetition rate.

5. The apparatus of claim 4 further including phase detector means responsive to said last IF signal for adjusting said local oscillator means so that said local oscillator signal is phase locked to said received signal.

6. The apparatus of claim 5 further including local pseudo random noise code generator means for providing said local pseudo random noise code to said correlator means, said local pseudo random noise code generator means being responsive to said local oscillator signal for generating said local pseudo random noise code in accordance therewith.

7. The apparatus of claim 4 wherein said filter means comprises a bandpass filter having a center frequency equal to said frequency of said last IF signal and a bandwidth sufficiently narrow to exclude said spectral lines.

8. The apparatus of claim 5 further including
    hard limiter means responsive to said last IF signal for converting said last IF signal to digital format, and wherein
    said phase detector means comprises digital phase detector means.

9. The apparatus of claim 1 wherein said spread spectrum receiver apparatus comprises a global positioning system receiver.

10. The apparatus of claim 9 wherein said global positioning system receiver comprises a long loop receiver.

* * * * *